United States Patent [19]
Rusnock

[11] Patent Number: 5,845,953
[45] Date of Patent: Dec. 8, 1998

[54] PICK-UP TRUCK BED DIVIDER

[76] Inventor: Daniel M. Rusnock, P.O. Box 37 5 E. Market St., Sheppton, Pa. 18248

[21] Appl. No.: 885,524

[22] Filed: Jun. 30, 1997

[51] Int. Cl.$^6$ .................................................. B62D 33/02
[52] U.S. Cl. ............................................................ 296/37.6
[58] Field of Search ............................... 296/37.6, 37.16

[56] References Cited

U.S. PATENT DOCUMENTS

| | | | |
|---|---|---|---|
| 4,917,429 | 4/1990 | Giger | 296/37.6 |
| 5,526,972 | 6/1996 | Frazier et al. | 296/37.6 |
| 5,597,193 | 1/1997 | Conner | 296/37.6 |

Primary Examiner—Gary C. Hoge

[57] ABSTRACT

A pick-up truck bed divider including a first frame section comprising a pair of outer cross members and a pair of interior cross members extending therebetween. A right side interior cross member has a central cross member extending outwardly therefrom in an orthogonal relationship. At least one divider panel is slidably disposed between the interior cross members. A second frame section comprises a pair of outer cross members having an interior cross member extending therebetween. A central cross member extends inwardly from the interior cross member for adjustable coupling with the central cross member of the first frame section. Four holding assemblies extend between outer ends of the outer cross members of the first and second frame sections and the side walls of the pick-up truck bed for securement to the pick-up truck bed.

4 Claims, 3 Drawing Sheets

PICK-UP TRUCK BED DIVIDER

BACKGROUND OF THE INVENTION

1. Field of the Invention

The present invention relates to a pick-up truck bed divider and more particularly pertains to adjustably configuring to provide various sizes of compartments with a pick-up truck bed divider.

2. Description of the Prior Art

The use of truck bed dividers is known in the prior art. More specifically, truck bed dividers heretofore devised and utilized for the purpose of dividing a truck bed are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,265,993 to Wayne discloses a truck bed divider system. U.S. Pat. No. 4,917,429 to Giger discloses a truck bed divider assembly. U.S. Pat. No. 4,733,899 to Keys discloses a pickup truck-bed divider device. U.S. Pat. No. 4,834,599 to Gordon et al. discloses a truck bed divider. U.S. Pat. No. 4,737,056 to Hunt discloses an extendable brace bar for securing cargo. U.S. Pat. No. Des. 350,526 to Wayne discloses the ornamental design for a vehicle cargo area divider.

While these devices fulfill their respective, particular objective and requirements, the aforementioned patents do not describe a pick-up truck bed divider for adjustably configuring to provide various sizes of compartments.

In this respect, the pick-up truck bed divider according to the present invention substantially departs from the conventional concepts and designs of the prior art, and in doing so provides an apparatus primarily developed for the purpose of adjustably configuring to provide various sizes of compartments.

Therefore, it can be appreciated that there exists a continuing need for new and improved pick-up truck bed divider which can be used for adjustably configuring to provide various sizes of compartments. In this regard, the present invention substantially fulfills this need.

SUMMARY OF THE INVENTION

In the view of the foregoing disadvantages inherent in the known types of truck bed dividers now present in the prior art, the present invention provides an improved pick-up truck bed divider. As such, the general purpose of the present invention, which will be described subsequently in greater detail, is to provide a new and improved pick-up truck bed divider and method which has all the advantages of the prior art and none of the disadvantages.

To attain this, the present invention essentially comprises a first frame section comprising a pair of outer cross members. The pair of outer cross members have outer ends positioned in an abutting relationship with a left side wall of a pick-up truck bed disposed on opposing sides of a right wheel well thereof. The pair of outer cross members have a pair of interior cross members extending therebetween. Each of the interior cross members has a series of spaced apart notches extending inwardly of upper edges thereof. A right side interior cross member has a central cross member extending outwardly therefrom in an orthogonal relationship. At least one divider panel is slidably disposed between the interior cross members within the notches formed therein. A second frame section is provided comprising a pair of outer cross members each having interior ends adjustably coupled with interior ends of the outer cross members of the first frame section. Outer ends of the pair of outer cross members of the second frame section are positioned in an abutting relationship with a left side wall of the pick-up truck bed disposed on opposing sides of a left wheel well thereof. An interior cross member extends between the pair of outer cross members. A central cross member extends inwardly from the interior cross member for adjustable coupling with the central cross member of the first frame section. Four holding assemblies extend between the outer ends of the outer cross members of the first and second frame sections and the side walls of the pick-up truck bed. The holding assemblies each comprise a receiving collar secured to one of the outer ends. The receiving collar has an open upper end with a knurled wheel disposed thereon. A threaded rod is adjustably received within the open upper end of the collar and coupled with the knurled wheel. An upper end of the threaded rod has an abutting plate disposed thereon for engagement with an underside of the side wall.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved pick-up truck bed divider which has all the advantages of the prior art truck bed dividers and none of the disadvantages.

It is another object of the present invention to provide a new and improved pick-up truck bed divider which may be easily and efficiently manufactured and marketed.

It is a further object of the present invention to provide a new and improved pick-up truck bed divider which is of durable and reliable construction.

An even further object of the present invention is to provide a new and improved pick-up truck bed divider which is susceptible of a low cost of manufacture with regard to both materials and labor, and which accordingly is then susceptible of low prices of sale to the consuming public, thereby making such a pick-up truck bed divider economically available to the buying public.

Even still another object of the present invention is to provide a new and improved pick-up truck bed divider for adjustably configuring to provide various sizes of compartments.

Lastly, it is an object of the present invention to provide a new and improved pick-up truck bed divider including a first frame section comprising a pair of outer cross members and a pair of interior cross members extending therebetween. A right side interior cross member has a central cross member extending outwardly therefrom in an orthogonal relationship. At least one divider panel is slidably disposed between the interior cross members. A second frame section comprises a pair of outer cross members having an interior cross member extending therebetween. A central cross member extends inwardly from the interior cross member for adjustable coupling with the central cross member of the first frame section. Four holding assemblies extend between outer ends of the outer cross members of the first and second frame sections and the side walls of the pick-up truck bed for securement to the pick-up truck bed.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
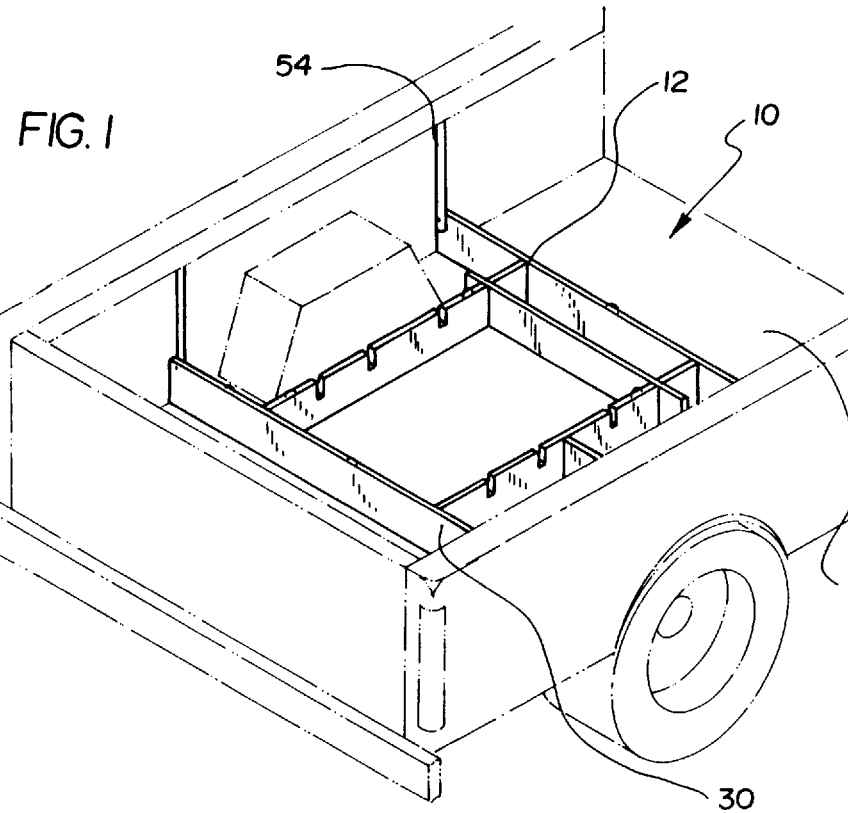
FIG. 1 is a perspective view of the preferred embodiment of the pick-up truck bed divider constructed in accordance with the principles of the present invention.
Figure 2:
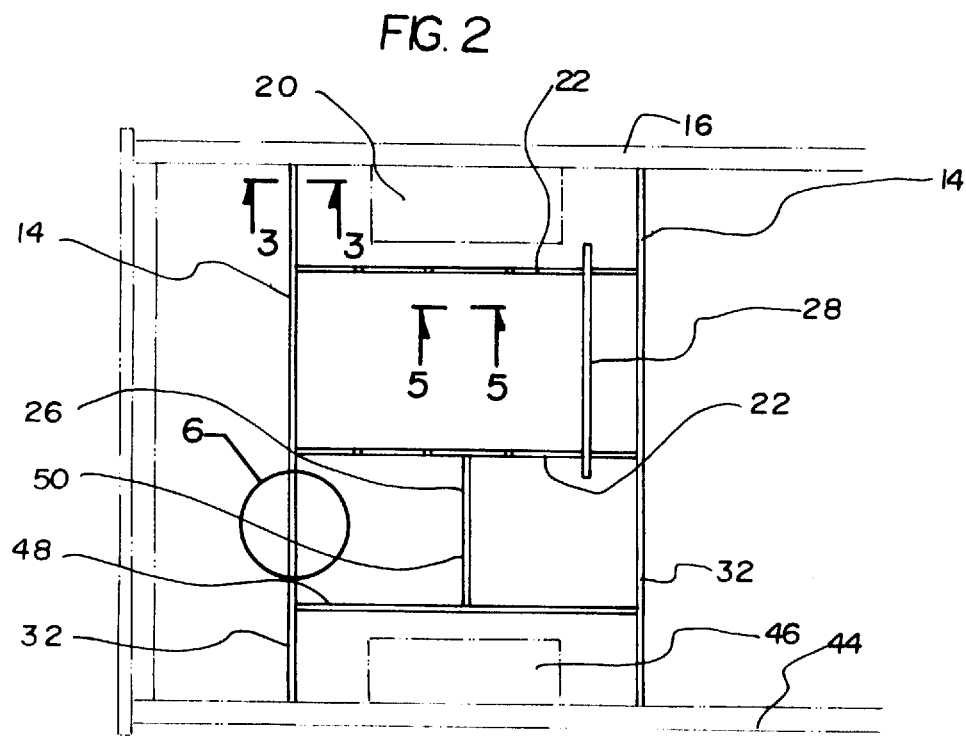
FIG. 2 is a top plan view of the present invention shown in use.

With reference now to the drawings, and in particular, to FIGS. 1 through 6 thereof, the preferred embodiment of the new and improved pick-up truck bed divider embodying the principles and concepts of the present invention and generally designated by the reference number 10 will be described.

Specifically, it will be noted in the various Figures that the device relates to a pick-up truck bed divider for adjustably configuring to provide various sizes of compartments. In its broadest context, the device consists of a first frame section, at least one divider panel, a second frame section and four holding assemblies. Such components are individually configured and correlated with respect to each other so as to attain the desired objective.

The first frame section 12 comprises a pair of outer cross members 14. The pair of outer cross members 14 have outer ends positioned in an abutting relationship with a left side wall 16 of a pick-up truck bed 18 disposed on opposing sides of a right wheel well 20 thereof. The pair of outer cross members 14 have a pair of interior cross members 22 extending therebetween. Each of the interior cross members 22 has a series of spaced apart notches 24 extending inwardly of upper edges thereof. A right side interior cross member has a central cross member 26 extending outwardly therefrom in an orthogonal relationship.

The divider panel 28 is slidably disposed between the interior cross members 22 within the notches 24 formed therein. The divider panel can be moved between the notches 24 so that the properly sized compartment is formed. Additional divider panels 28 can be provided to provide multiple smaller compartments.

The second frame section 30 is provided comprising a pair of outer cross members 32 each having interior ends 34 adjustably coupled with interior ends 36 of the outer cross members 14 of the first frame section 12. The interior ends 34,36 are adjustably coupled together via a lap joint. Each of the interior ends is provided with an elongated slot 38 whereby the interior ends are joined together and a nut 40 and bolt 42 arrangement couples the interior ends together. The elongated slots 38 allow the length of the outer cross members 14,32 to be adjusted to accommodate the width of the truck bed. Note FIG. 6. Outer ends of the pair of outer cross members 32 of the second frame section 30 are positioned in an abutting relationship with a left side wall 44 of the pick-up truck bed 18 disposed on opposing sides of a left wheel well 46 thereof. An interior cross member 48 extends between the pair of outer cross members 32. A central cross member 50 extends inwardly from the interior cross member 48 for adjustable coupling with the central cross member 26 of the first frame section 12. The adjustable coupling is facilitated via the lap joint as discussed above and illustrated in FIG. 6.

Figure 3:
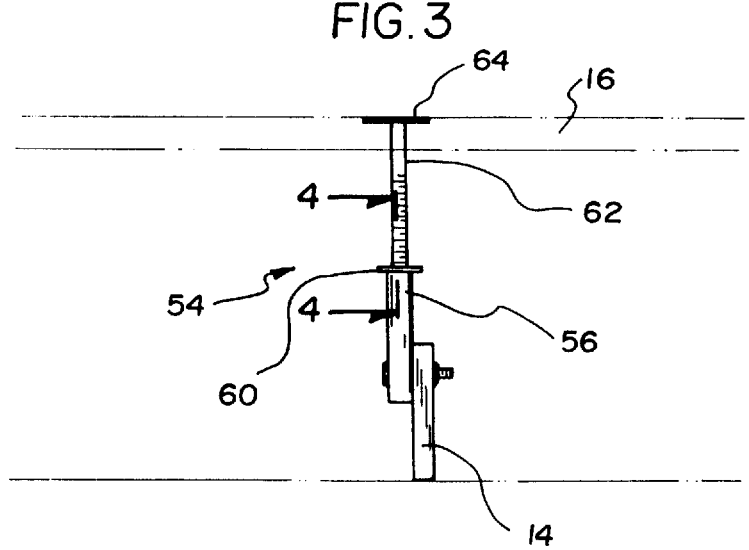
FIG. 3 is a cross-sectional view as taken along line 3—3 of FIG. 2.
Figure 4:
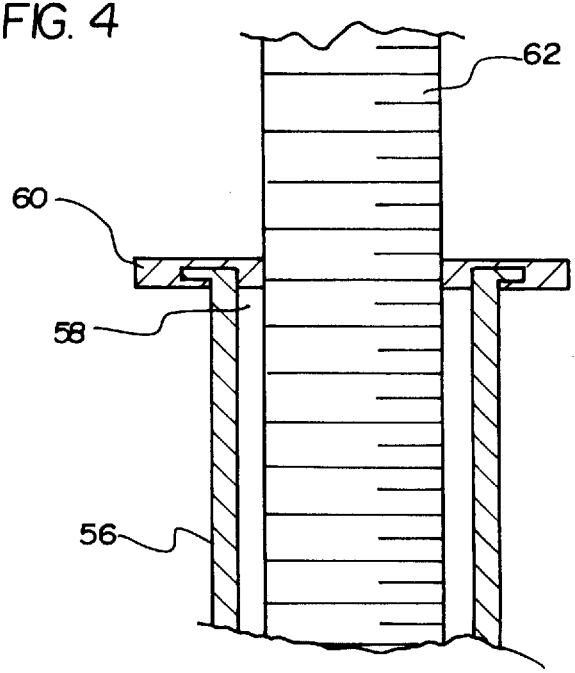
FIG. 4 is a cross-sectional view as taken along line 4—4 of FIG. 3.
Figure 5:
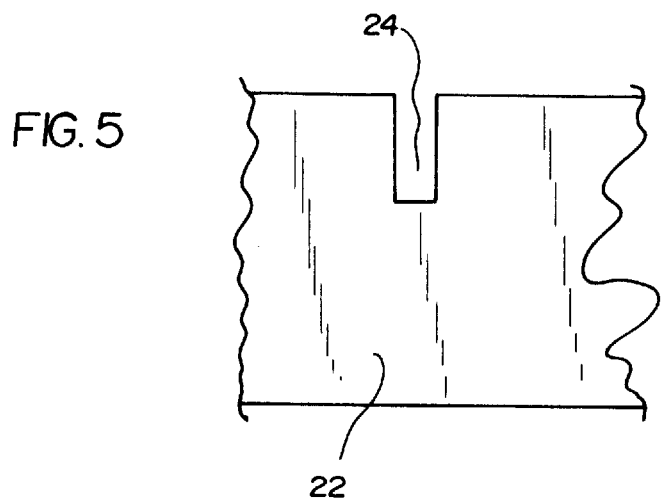
FIG. 5 is a side view of one of the walls as taken along line 5—5 of FIG. 2.
Figure 6:
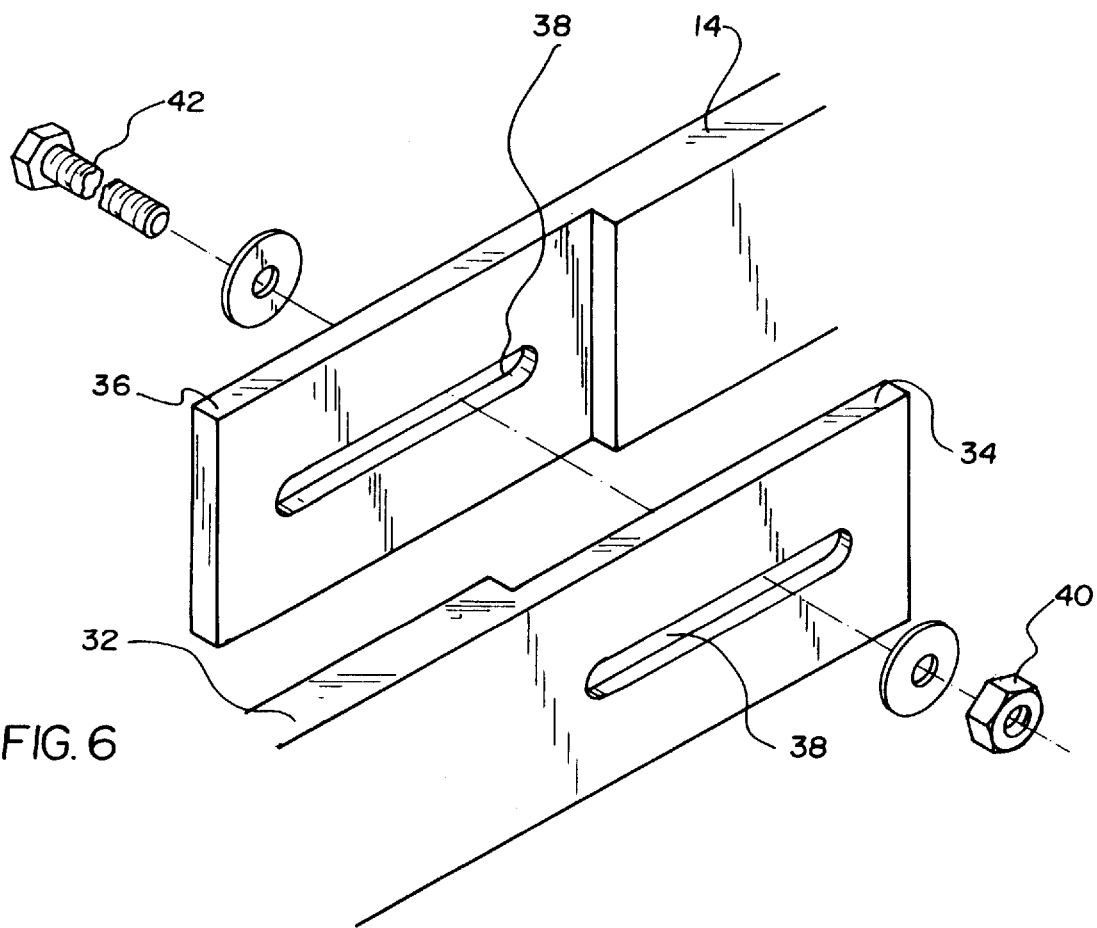
FIG. 6 is a perspective view of the adjustable section of one on the two end walls of the present invention as taken from circle 6 of FIG. 2.

The four holding assemblies 54, as illustrated in FIG. 3 and 4, extend between the outer ends of the outer cross members 14,32 of the first 12 and second frame sections 30 and the side walls 16,44 of the pick-up truck bed 18. The holding assemblies 54 each comprise a receiving collar 56 secured to one of the outer ends. The receiving collar 56 has an open upper end 58 with a knurled wheel 60 disposed thereon. A threaded rod 62 is adjustably received within the open upper end 58 of the collar 56 and coupled with the knurled wheel 60 whereby rotation of the knurled wheel 60 will facilitate the raising and lowering of the threaded rod 62 with respect to the receiving collar 56. An upper end of the threaded rod 62 has an abutting plate 64 disposed thereon for engagement with an underside of the side wall 16,44.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A pick-up truck bed divider positionable between opposed wheel wells thereof for adjustably configuring to provide various sizes of compartments comprising, in combination:

a first frame section comprising a pair of outer cross members, the pair of outer cross members having outer ends positioned in an abutting relationship with a left side wall of a pick-up truck bed disposed on opposing sides of a left wheel well thereof, the pair of outer cross members having a pair of interior cross members extending therebetween, each of the interior cross members having a series of spaced apart notches extending inwardly of upper edges thereof, a right side interior cross member having a central cross member extending outwardly therefrom in an orthogonal relationship;

at least one divider panel slidably disposed between the interior cross members within the notches formed therein;

a second frame section comprising a pair of outer cross members each having interior ends adjustably coupled with interior ends of the outer cross members of the first frame section, outer ends of the pair of outer cross members of the second frame section positioned in an abutting relationship with a right side wall of the pick-up truck bed disposed on opposing sides of a right wheel well thereof, an interior cross member extending between the pair of outer cross members, a central cross member extending inwardly from the interior cross member for adjustable coupling with the central cross member of the first frame section; and four holding assemblies extending between the outer ends of the outer cross members of the first and second frame sections and the side walls of the pick-up truck bed, the holding assemblies each comprising a receiving collar secured to one of the outer ends, the receiving collar having an open upper end with a knurled wheel disposed thereon, a threaded rod adjustably received within the open upper end of the collar and coupled with the knurled wheel, an upper end of the threaded rod having an abutting plate disposed thereon for engagement with an underside of the side wall.

2. A pick-up truck bed divider positionable between opposed wheel wells thereof for adjustably configuring to provide various sizes of compartments comprising, in combination:

a first frame section comprising a pair of outer cross members and a pair of interior cross members extending therebetween, a right side interior cross member having a central cross member extending outwardly therefrom in an orthogonal relationship;

at least one divider panel slidably disposed between the interior cross members;

a second frame section comprising a pair of outer cross members each having interior ends adjustably coupled with interior ends of the outer cross members of the first frame section and having an interior cross member extending therebetween, a central cross member extending inwardly from the interior cross member for adjustable coupling with the central cross member of the first frame section; and four holding assemblies extending between outer ends of the outer cross members of the first and second frame sections and the side walls of the pick-up truck bed for securement to the pick-up truck bed.

3. The pick-up truck bed divider as set forth in claim 2 wherein each of the interior cross members of the first frame section has a series of spaced apart notches extending inwardly of upper edges thereof, the notches adapted for receiving the divider panel.

4. The pick-up truck bed divider as set forth in claim 2 wherein the holding assemblies each comprise a receiving collar secured to one of the outer ends of the outer cross members, the receiving collar having an open upper end with a knurled wheel disposed thereon, a threaded rod adjustably received within the open upper end of the collar and coupled with the knurled wheel, an upper end of the threaded rod having an abutting plate disposed thereon for engagement with an underside of the side wall.

* * * * *